United States Patent [19]

Neyer et al.

[11] Patent Number: 4,621,124
[45] Date of Patent: Nov. 4, 1986

[54] CATALYST SYSTEM FOR THE POLYMERIZATION OF ETHYLENE

[75] Inventors: Jean-Marie Neyer; Jean-Pierre Machon, both of Bethune; Karel Bujadoux, Lens, all of France

[73] Assignee: Societe Chimique des Charbonnages-CdF Chimie, Paris, France

[21] Appl. No.: 775,711

[22] Filed: Sep. 16, 1985

Related U.S. Application Data

[63] Continuation of Ser. No. 177,432, Aug. 12, 1980, abandoned, which is a continuation of Ser. No. 948,157, Oct. 3, 1978, abandoned, which is a continuation of Ser. No. 770,271, Feb. 22, 1977, abandoned.

[30] Foreign Application Priority Data

Feb. 25, 1976 [FR] France .................. 76 05258

[51] Int. Cl.$^4$ .................. C08F 4/02; C08F 10/02
[52] U.S. Cl. .................. 526/125; 502/105; 502/110; 502/134; 526/151; 526/352; 526/904; 526/906; 526/919; 526/902
[58] Field of Search .............. 502/115, 134; 526/125

[56] References Cited

U.S. PATENT DOCUMENTS 3,892,717 7/1975 Mori et al. .................. 526/124
3,969,332 7/1976 Gloriod et al. .................. 526/127

FOREIGN PATENT DOCUMENTS 2350795 4/1974 Fed. Rep. of Germany .
1292853 10/1972 United Kingdom .
1314258 4/1973 United Kingdom .
1391322 4/1975 United Kingdom .
1414883 11/1975 United Kingdom .
1441115 6/1976 United Kingdom .

Primary Examiner—Edward J. Smith
Attorney, Agent, or Firm—Finnegan, Henderson, Farabow, Garrett & Dunner

[57] ABSTRACT

A catalyst system for use in the polymerization of ethylene under high pressure and temperature containing an alkyl-aluminum or alkylsiloxalane activator and a compound of the formula:

$$(TiCl_a)(MgCl_2)_y(AlCl_3)_z(RmgCl)_b$$

in which
a is from 2 to 3;
y is 2 or more;
z is from 0 to $\frac{1}{2}$;
b is from 0 to 1; and
R is an aliphatic or aromatic hydrocarbon radical.

3 Claims, 1 Drawing Figure

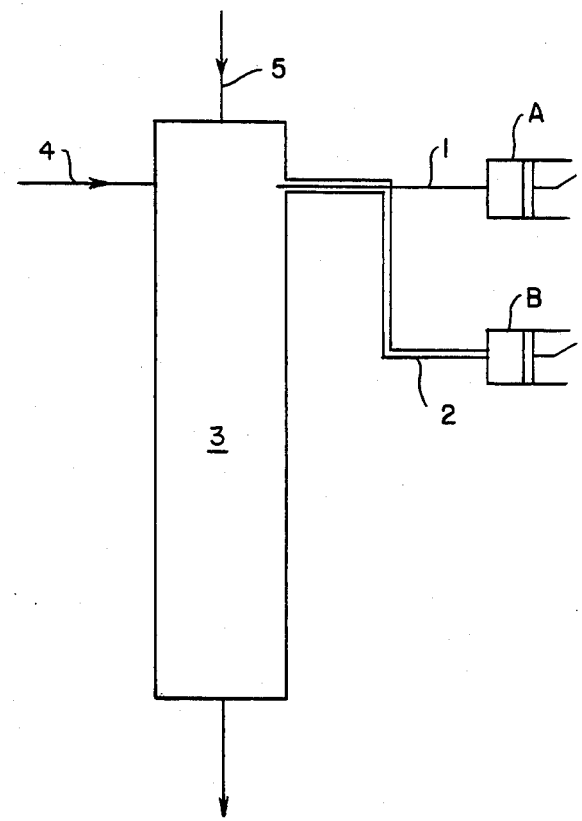

CATALYST SYSTEM FOR THE POLYMERIZATION OF ETHYLENE

This application is a continuation of Ser. No. 177,432, filed Aug. 12, 1980, which is a continuation of Ser. No. 948,157, filed Oct. 3, 1978, which is a continuation of Ser. No. 770,271, filed Feb. 22, 1977, all now abandoned.

The present invention relates to an improved process for the polymerization of ethylene under high pressures and, more particularly, to a process for the polymerization of ethylene at high pressures and temperatures with Ziegler type catalysts.

It is well known in the art to polymerize ethylene under high pressure and temperature with an ionic mechanism, using a catalyst system comprising first, a halogen compound of a transition metal such as titanium trichloride, optionally cocrystallized with aluminum trichloride, and, secondly, an activator such as an alkyl-aluminum or an alkylsiloxalane.

It is also known, from British Pat. No. 1,441,117, to polymerize ethylene under high pressure and high temperature with a catalyst obtained by reacting a halogen derivative of a transition metal and a compound of the formula $Cl_{2-n} Mg (OR)_n$, in which n is 1 or 2 and R is a hydrocarbon radical. It is also known to introduce small amounts of hydrogen, which functions as a transfer agent, into the polymerization process.

The above-mentioned processes have in common the fact that their catalyst systems are very sensitive to the influence of hydrogen and temperature. Thus, the thermal destruction reactions, which have higher activation energies than those of the polymerization reaction, reach such speeds that the catalytic yield continuously and significantly decreases above 200° C. and the content of catalyst residues becomes generally unacceptable above 260° C.

Further, the speeds of dimerization and trimerization of ethylene become such that the density of the polyethylene obtained continuously decreases until values are reached, which are unacceptable for injection-molding. Finally the thermal transfer reactions become so extensive that the various mechanical properties of the resins decline very greatly when the polymerization temperature exceeds 260° C.

Those skilled in the art have therefore, for several years past, been concerned with investigating catalyst systems that are less sensitive to the influence of temperature and of hydrogen and which usually make it possible to prepare resins having good mechanical properties at up to 260°–340° C.

In accordance with the present invention, a new and improved catalyst system is provided that avoids these problems in the polymerization of ethylene resulting in higher yields and acceptable catalyst residues. More particularly, the present invention comprises in a process for the polymerization of ethylene at a temperature of between 180° and 340° C. and under a pressure of between 200 and 2500 bars in at least one reaction zone, the improvement of polymerizing the ethylene in the presence of a catalyst system comprising (A) an activator selected from the group consisting of alkyl-aluminums and alkylsiloxalanes and (B) a compound of the formula:

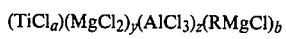
$(TiCl_a)(MgCl_2)_y(AlCl_3)_z(RMgCl)_b$ in which
 a is from 2 to 3;
 y is 2 or more;
 z is from 0 to ½;
 b is from 0 to 1; and
 R is an aliphatic or aromatic hydrocarbon radical.

The proportions of (A) and (B) are chosen so as to give an atomic ratio of Al/Ti of between 1 and 10. The process is applicable not only to the production of polyethylene but also to the co-polymerization of ethylene with a comonomer such as propylene or 1-butene and to the terpolylmerization of ethylene with, for example, propylene and a diene.

The process of polymerizing the ethylene in the presence of this new and improved catalyst system can be carried out in a known manner in a stirred reactor possessing at least one reaction zone in which the residence time of the catalyst in each reaction zone of the reactor is from 1 to 150 seconds. The process can be carried out in several reactors arranged in series. It can also be carried out using an inert diluent such as propane or butane so as to ensure the homogeneity of the reaction mixture in the reaction zone, though the same effect may be achieved by a rise in temperature, without hazard to the properties of the resin.

Exemplary of suitable alkyl-aluminum compounds as activators are trioctylaluminum, chlorodiethylaluminum, triethylaluminum, tri-n-butylaluminum, tri-isobutylaluminum and tri-isoprenyl aluminum.

Suitable alkylsiloxalanes as activators in the catalyst system of the present invention are compounds of formula $(R_1 R_2 R_3)$ Si—O—Al $(R_4 R_5)$, wherein $R_1$, $R_2$, $R_3$ and $R_4$ are saturated hydrocarbon radicals of from 1 to 10 carbon atoms and $R_5$ may be the same or —O—Si $(R_1 R_2 R_3)$. Exemplary of such compounds are trimethyl-dimethylsiloxalane, trimethyl-dioctyl-siloxalane and dimethylethyl-diethyl siloxalane.

There are various methods of preparing compound (B) in the catalyst system which has the formula $(TiCl_a)(MgCl_2)_y (AlCl_3)_z (RMgCl)_b$. These include the reduction of titanium tetrachloride by organomagnesium compounds; the reduction of titanium tetrachloride by means of aluminum in the presence of magnesium chloride; the co-grinding of violet titanium trichloride with anhydrous magnesium chloride and the reduction, by means of an alkyl-aluminum, of titanium tetrachloride absorbed on anhydrous magnesium chloride. These methods make it possible to obtain compounds (B) in which the percentages by weight of the various elements are as follows:

Mg is from 12 to 28%
Ti is from 0.5 to 13%
Cl is from 65 to 75%
Al is from 0 to 3%

It is also possible, and particularly advantageous, to produce the compound (B) of the catalyst system in the reaction zone. For this purpose, a suitable device such as shown in the accompanying drawing can be provided for each reaction zone. The device comprises a pump A for injecting, for example, violet titanium trichloride under high pressure through a pipe 1 into a reactor 3, and a pump B for injecting, for example, anhydrous magnesium chloride and activator A under high pressure through pipe 2 into the reactor 3. The pipes 1 and 2 open concentrically into reactor 3 which is fed with fresh ethylene and with recycled ethylene through pipes 4 and 5.

The device can be further modified by joining the pipes 1 and 2 before they enter reactor 3. This provides greater flexibility in regulating the formulation of the compound (B) of the catalyst system and consequently for obtaining resins possessing certain properties.

According to this variant the "in situ" production of the compound (B) is favored by the thermal shock which the catalyst components undergo at entry into the reactor. Because of the approach of the magnesium atoms, this shock leads to a modification of the configuration of the titanium atoms, which imparts a lower dimerising power to the catalyst system.

Among the numerous advantages achieved by the present invention in the process of polymerizing ethylene is that the regulation of the melt index and the width of the molecular weight distribution no longer depend solely on the hydrogen concentration, so there is greater flexibility in the manufacture of resins intended for various applications. Also, it is possible to operate the extreme reaction zones of a reactor at very different temperatures without fear of the formation of waxes or of excessively high molecular weights in these zones. Further, the last reaction zone can, while maintaining the same quality of resin, be operated at a temperature which is 40° to 80° C. above the usual temperature, resulting in an economically significant improvement in the degree of conversion.

To illustrate the invention more specifically, reference is made to the following examples. These examples illustrate the preparation of the catalyst system of the present invention, the polymerization of ethylene according to prior art systems, and the polymerization of ethylene with the catalyst system of this invention.

The examples are merely illustrative and are to be understood as not limiting the scope and underlying principles of the invention in any way.

EXAMPLES 1–5 (COMPARATIVE)

These examples are representative of prior art processes for the polymerization of ethylene and are conducted for comparative purposes.

In these examples, ethylene is polymerized in a stirred reactor comprising three zones; each zone being characterized by a temperature T° C. and by its proportion $\phi$ of the total feed flow. The catalyst comprises a titanium trichloride pre-activated with trioctylaluminum until an atomic ratio of Al/Ti of 1 is reached. It is then prepolymerized with 1-hexene in a hexene/Ti ratio of 3 to 5 mols/atom and finally activated with trioctylaluminum until a final atomic ratio of Al/Ti of 3 is reached.

In Examples 1 to 4, violet titanium trichloride cocrystalized with aluminum trichloride is used and in Example 5, a brown titanium trichloride is used; obtained by reducing titanium tetrachloride at 0° C. with triethylaluminum followed by filtering and washing with methyl-cyclohexane.

The reactor is of a cylindrical autoclave reactor; each reaction zone being equipped with injectors for the catalyst and for ethylene, and with two thermocouples. The reaction zones are of identical volume and the mean residence times through the whole reactor are between 25 and 60 seconds. Hydrogen ($H_2$) is employed as the transfer agent and propane ($C_3H_8$) as the diluent. Table I below summarizes the reaction conditions of the examples.

TABLE I

| Example | Pressure (bars) | % $H_2$ | % $C_3H_8$ | Zone 1 $\phi$ | Zone 1 $T_1$ | Zone 2 $\phi_2$ | Zone 2 $T_2$ | Zone 3 $\phi_3$ | Zone 3 $T_3$ |
|---|---|---|---|---|---|---|---|---|---|
| 1 | 1,200 | 0.8 | 5 | 50 | 220 | 30 | 250 | 20 | 260 |
| 2 | 1,200 | 0.2 | 5 | 50 | 240 | 40 | 240 | 10 | 240 |
| 3 | 1,200 | 0.3 | 5 | 50 | 220 | 40 | 250 | 10 | 260 |
| 4 | 1,200 | — | — | 50 | 260 | 40 | 265 | 10 | 270 |
| 5 | 1,200 | 0.3 | — | 50 | 220 | 40 | 245 | 10 | 260 |

Table II below gives the polymerization results, including: the catalytic yield in kilograms of polymer per milliatom of titanium; the percentage of conversion; the melt index (MI) in g/10 mins measured according to Standard Specification ASTM-D1238 73; the density ($\rho$) in g/cm$^3$ measured at 23° C. on samples which have been reheated for 1 hour at 150° C. and cooled at the rate of 50° C./hour; the % elongation at break (EB); the tensile strength (TS) in kg/cm$^2$; the flexion elasticity modulus (FEM) in kg/cm$^2$; and the content of 1-butene ($C_4H_8$) by weight.

TABLE II

| Example | Catalytic yield | % Conversion | MI | $\rho_3$ | EB | TS | FEM |
|---|---|---|---|---|---|---|---|
| 1 | 4.6 | 16.7 | 5.2 | 0.965 | 300 | 290 | 8,200 |
| 2 | 4.8 | 16.5 | 0.35 | 0.967 | 800 | 350 | 7,800 |
| 3 | 4.5 | 17.3 | 0.8 | 0.966 | 700 | 310 | 8,200 |
| 4 | 3.0 | 18.0 | 1.5 | 0.957 | 400 | 220 | 5,000 |
| 5 | 3.8 | 17.1 | 1.1 | 0.964 | 500 | 280 | 7,500 |

EXAMPLES 6 AND 7

A. Preparation of Catalyst Systems

Titanium tetrachloride is added, at 0° C., to a suspension of n-butyl-magnesium in a saturated $C_{11}$–$C_{12}$ hydrocarbon mixture until an atomic ratio of Ti/Mg of about 0.35 is obtained. The mixture is then heated at 130° C. for four hours. After filtration and several washes, the composition by weight of the dry solid catalyst is as follows:

Mg = 26.6%;
Cl = 62.4%;
Ti = 3.0%;
organic residues = 7.9%

The solid catalyst, suspended in methylcyclohexane, is first preactivated with trioctylaluminum until the atomic ratio of Al/Ti is 1; it is then prepolymerized with 1-hexene using a molar ratio of hexene/Ti of 2 and finally activated by trioctylaluminum until the atomic ratio of Al/Ti is 3.

B. Polymerization

Polymerization of ethylene is carried out in the same reactor as used in Examples 1 to 5 with the above catalyst system. Table III below sets forth the reactor conditions, the symbols being the same as used in Examples 1–5.

TABLE III

| Example | Pressure (bars) | % $H_2$ | % $C_3H_8$ | Zone 1 $\phi_1$ | Zone 1 $T_1$ | Zone 2 $\phi_2$ | Zone 2 $T_2$ | % $\phi_3$ |
|---|---|---|---|---|---|---|---|---|
| 6 | 1,200 | 0.1 | 5 | 50 | 225 | 40 | 260 | 10 |
| 7 | 1,200 | — | — | 50 | 240 | 40 | 270 | 10 |

Table IV below summarizes the results of the polymerization, the symbols being the same as used in Examples 1–5.

TABLE IV

| Example | Catalytic yield | % Conversion | MI | ρ | EB | TS | FEM |
|---|---|---|---|---|---|---|---|
| 6 | 11.9 | 18.4 | 0.7 | 0.969 | 800 | 350 | 8,900 |
| 7 | 12.1 | 19.3 | 5.1 | 0.963 | 300 | 290 | 7,600 |

EXAMPLES 8 TO 10

In these examples a solid catalyst is prepared by co-grinding anhydrous magnesium chloride and a violet titanium trichloride sold by TOHO TITANIUM under the trademark TAC 191. Its composition by weight is as follows:

Mg=16.7 %;
Cl=73.1%;
Ti=8.2%;
Al=1.5%

The solid catalyst is suspended in methylcyclohexane, and is activated as in Examples 6 and 7.

Polymerization is carried out in the same reactor as Examples 1 to 5 and the reaction conditions are set forth in Table V below, the symbols have the same meaning as set forth in Examples 1-5.

TABLE V

| Example | Pressure (bars) | % H$_2$ | % C$_3$H$_8$ | Zone 1 $\phi_1$ | Zone 1 T$_1$ | Zone 2 $\phi_2$ | Zone 2 T$_2$ | $\phi_3$ |
|---|---|---|---|---|---|---|---|---|
| 8 | 1,200 | — | — | 50 | 260 | 40 | 265 | 10 |
| 9 | 1,200 | 0.1 | — | 50 | 245 | 40 | 265 | 10 |
| 10 | 1,200 | — | 5 | 50 | 210 | 40 | 260 | 10 |

Table VI below summarizes the results of the polymerization, the symbols having the same meaning as set forth in Examples 1-5.

TABLE VI

| Example | Catalytic yield | % Conversion | MI | ρ | EB | TS | FEM | % C$_4$H$_8$ |
|---|---|---|---|---|---|---|---|---|
| 8 | 13.9 | 18.1 | 0.45 | 0.966 | 900 | 370 | 8,500 | 0.4 |
| 9 | 13.7 | 18.5 | 1.8 | 0.967 | 600 | 350 | 8,800 | 0.3 |
| 10 | 12.5 | 19.1 | 0.6 | 0.964 | 700 | 320 | 8,000 | 0.7 |

EXAMPLE 11

This example demonstrates "in situ" production of the compound (B) of the catalyst system of the present invention.

In this example, polymerization is carried out in a stirred autoclave reactor having a reaction zone operating at 250° C. under a pressure of 1,500 bars and equipped with a device as shown in the drawing. Hydrogen is employed, as the transfer agent, at the rate of 0.2% by volume. Pump A injects violet titanium trichloride TAC 191 (see Examples 8-10) and pump B injects the anhydrous magnesium chloride at rates such that the composition by weight of the catalyst constituent (B) formed "in situ" is as follows:

Mg=23.0%;
Cl=74.15%;
Ti=2.4%;
Al=0.45%

Trioctylaluminum as the activator is injected also by pump B so as to give an atomic ratio of Al/Ti of 3 and the residence time of the catalyst system in the reactor is 30 seconds.

The polymerization results are as follows:
Catalytic yield=4.0 kg/milliatom of Ti
MI=0.62 g/10 mins
ρ=0.962 g/cm$^3$ Furthermore, the content by weight of polyethylene (PE) having a molecular weight less than 5,000 is 9.8%.

EXAMPLE 12 (COMPARATIVE)

Polymerization is carried out in the same reactor and in the same manner as in Example 11, but operating at 280° C. under a pressure of 1,500 bars. The hydrogen content is 0.1% by volume. Pumps A and B operate with feed rates such that the composition by weight of the catalyst constituent (B) formed "in situ" falls outside the scope of the invention and is as follows:

Mg=4.0%;
Cl=71.9%;
Ti=20.3%;
Al=3.8%

With identical activation and identical residence time to those of Example 11, the polymerization results are as follows:

Catalytic yield=2.8 kg/milliatom of Ti
MI=1.05 g/10 mins
ρ=0.949 g/cm$^3$
PE=24%

EXAMPLES 13 (COMPARATIVE) AND 14

As in Examples 8 to 10, a solid catalyst is prepared by co-grinding anhydrous magnesium chloride and violet titanium trichloride TAC 191.

Its composition by weight is as follows:
Mg=21.5%;
Cl=74.0%;
Ti=3.8%;
Al=0.7%

The solid catalyst, in suspension in methylcyclohexane, is activated as in Examples 6 and 7. Polymerization is carried out in solution in methylcyclohexane in the same reactor as in Examples 1 to 5. Hydrogen is employed as the transfer agent, and the temperature is 250° C. The residence time of the catalytic system in the reactor is 30 seconds.

Pressure has been modified between the Examples to show its influence on the properties of the polymer produced; namely, the weight-average molecular weight (M$_w$), the number-average molecular weight (M$_n$) and the weight content of polyethylene (PE) having a molecular weight under 5,000.

Table VII below summarizes the results of these polymerizations:

TABLE VII

| Example | Pressure (bars) | % H$_2$ | M$_w$ | M$_n$ | PE |
|---|---|---|---|---|---|
| 13 | 100 | 1.5 | 35,000 | 10,000 | 11.2% |
| 14 | 600 | 2.0 | 54,000 | 15,500 | 5.8% |

We claim:

1. In a process for the polymerization of ethylene at a temperature of between 210° and 340° C. under a pressure of between 200 and 2,500 bars in at least one reaction zone, the improvement comprising polymerizing the ethylene in the zone in the presence of a catalyst system consisting essentially of (A) an activator selected from the group consisting of alkyl-aluminums and alkyl-siloxalanes and (B) a compound of the formula:

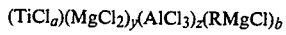

in which
- the valence of titanium a is from 2 to 3;
- y is 2 or more;
- z is from 0 to ⅓;
- b is from 0 to 1; and
- R is an aliphatic or aromatic hydrocarbon radical, said compound (B) being prepared in the reaction zone by injecting separately and concentrically into the reaction zone violet titanium trichloride and anhydrous magnesium chloride, the ratio of activator (A) to compound (B) being such as to give an atomic ratio of Al/Ti of between 1 and 10, in order to achieve a productivity of at least 480 kg polymer per hour per milliatom of titanium.

2. In a process for the polymerizaion of ethylene at a temperature of between 210° and 340° C. under a pressure of between 200 and 2,500 bars in at least one reaction zone, the improvement comprising polymerizing the ethylene in the zone in the presence of a catalyst system consisting essentially of (A) an activator selected from the group consisting of alkyl-aluminums and alkyl-siloxalanes and (B) a compound comprising (1) a titanium chloride in which the valence of titanium is from 2 to 3, (2) magnesium dichloride, optionally (3) aluminum trichloride, and optionally (4) an organomagnesium chloride RMgCl in which R is an aliphatic or aromatic hydrocarbon radical, the percentage by weight of each of the elements magnesium, titanium, chlorine, and aluminum in said compound (B) being:

Mg 12–18
Ti 0.5–13
Cl 65–75
Al 0–3, said compound (B) being prepared in the reaction zone by injecting separately and concentrically into the reaction zone violet titanium trichloride and anhydrous magnesium chloride, the ratio of activator (A) to compound (B) being such as to give an atomic ratio of Al/Ti of between 1 and 10, in order to achieve a productivity of between 480 and 2,000 kg polymer per hour per milliatom of titanium.

3. The process of claim 1 or claim 2, wherein said activator is injected into the reaction zone with said anhydrous magnesium chloride and separately and concentrically with respect to said violet titanium trichloride.

* * * * *